United States Patent
Czekala

(10) Patent No.: US 11,187,587 B1
(45) Date of Patent: Nov. 30, 2021

(54) CALIBRATION DEVICE AND METHOD OF CALIBRATING A MICROWAVE RADIOMETER

(71) Applicant: Rohde & Schwarz GmbH & Co. KG, Munich (DE)

(72) Inventor: Harald Czekala, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/991,596

(22) Filed: Aug. 12, 2020

(51) Int. Cl.
  *G01J 5/08* (2006.01)
  *G01K 11/00* (2006.01)
  *G01J 5/02* (2006.01)
  *G01J 5/00* (2006.01)

(52) U.S. Cl.
  CPC ............... *G01J 5/08* (2013.01); *G01J 5/0205* (2013.01); *G01K 11/006* (2013.01); *G01J 2005/0048* (2013.01)

(58) Field of Classification Search
  CPC .... G01J 5/08; G01J 5/0205; G01J 2005/0048; G01K 11/006
  See application file for complete search history.

(56) References Cited

U.S. PATENT DOCUMENTS

| | | | | |
|---|---|---|---|---|
| 5,526,676 A | * | 6/1996 | Solheim | G01K 11/006 324/640 |
| 5,573,339 A | * | 11/1996 | Woskov | G01J 5/522 374/126 |

FOREIGN PATENT DOCUMENTS

| | | |
|---|---|---|
| CN | 201218838 U | 4/2009 |
| CN | 103885096 A | 6/2014 |
| CN | 109239805 A | 1/2019 |
| CN | 208969254 U | 6/2019 |
| WO | 2020/009070 A1 | 1/2020 |

* cited by examiner

*Primary Examiner* — David P Porta
*Assistant Examiner* — Meenakshi S Sahu
(74) *Attorney, Agent, or Firm* — Christensen O'Connor Johnson Kindness PLLC

(57) ABSTRACT

A calibration device for precise calibration of a microwave radiometer is described. The calibration device has a housing that partially encompasses a calibration chamber. The housing includes a microwave transparent portion that is provided at a wall of the housing. The microwave transparent portion defines an entry for microwaves into the calibration chamber. The microwave transparent portion is made by a microwave transparent material that is insulating. An absorber at a defined temperature is provided within the calibration chamber. An interface between the microwave transparent portion and the absorber is provided, which ensures a substantially reflection free entry of the microwaves into the calibration chamber. The substantially reflection free entry of the microwaves corresponds to capturing at least 3 orders of reflection of the microwaves. Further, a method of calibrating a microwave radiometer is described.

18 Claims, 2 Drawing Sheets

CALIBRATION DEVICE AND METHOD OF CALIBRATING A MICROWAVE RADIOMETER

FIELD OF THE DISCLOSURE

The present disclosure relates to a calibration device for precise calibration of a microwave radiometer. Further, the present disclosure relates to a method of calibrating a microwave radiometer.

BACKGROUND

Microwave radiometers are typically calibrated in a quasi-optical manner by observing a cold reference object among others. The cold reference object relates to a microwave absorber that is submerged in liquid nitrogen ($LN_2$) such that the absorber is cooled down to a defined temperature. However, reflections at an interface between air and the liquid nitrogen, establishing a refractive index jump from 1.0 to 1.2, as well as an unavoidable mismatch of the microwave radiometer may cause standing waves, which lead to an incorrect calibration of the microwave radiometer.

Furthermore, condensation of atmospheric oxygen may occur when the liquid nitrogen comes into contact with the air. This is called "oxygen entrainment", which may change the boiling point of the liquid nitrogen, thereby also leading to an incorrect calibration of the microwave radiometer due to incorrect assumptions about the temperature of the microwave absorber.

In addition, the cold temperature of the liquid nitrogen, namely approximately −196° C., may result in condensation of air humidity and, thus, condensation water on radiometer components and the calibration setup may occur which affect the calibration accuracy. In some embodiments, a beam path originating from the microwave radiometer to the reference object is no longer completely transparent, which in turn leads to an incorrect calibration of the microwave radiometer.

In the state of the art, it is known to use an arrangement of pyramid absorber material that is placed horizontally in a container filled with liquid nitrogen in order to cool down the pyramid absorber material. The microwave radiometer faces the absorber material via a plane mirror arranged at 45 degrees above the liquid nitrogen by means of a horizontal line of sight. However, this concept causes back reflection at the nitrogen surface, standing waves, oxygen interference and condensation problems due to the issues mentioned above, which result in an inaccurate calibration of the microwave radiometer.

Moreover, it is known to use horizontally orientated absorber that is submerged into a liquid nitrogen bath within a container, which is set atop a microwave radiometer. However, this setup is disadvantageous since an airflow between the container and the microwave radiometer occurs, resulting in condensation water.

Accordingly, there is a need for a calibration device that can be used for precise calibration of a microwave radiometer.

SUMMARY

The present disclosure provides examples of a calibration device for precise calibration of a microwave radiometer. In an embodiment, the calibration device has a housing that partially encompasses a calibration chamber. The housing comprises a microwave transparent portion that is provided at a wall of the housing. The microwave transparent portion defines an entry for microwaves into the calibration chamber. The microwave transparent portion is made by a microwave transparent material that is insulating. An absorber at a defined temperature is provided within the calibration chamber. An entry interface between the microwave transparent portion and the calibration chamber is provided, which ensures a substantially reflection free entry of the microwaves into the calibration chamber. The substantially reflection free entry of the microwaves corresponds to capturing at least 3 orders of reflection of the microwaves.

Further, the present disclosure provides examples of a method of calibrating a microwave radiometer. In an embodiment, the method comprises the steps of:

providing a microwave radiometer;

providing a calibration device that has a housing that partially encompasses a calibration chamber, wherein the housing comprises a microwave transparent portion that defines an entry for microwaves into the calibration chamber, wherein the microwave transparent portion is made by a microwave transparent material that is insulating, wherein an absorber at a defined temperature is provided within the calibration chamber, wherein an entry interface between the microwave transparent portion and the calibration chamber is provided, which ensures a substantially reflection free entry of the microwaves into the calibration chamber, and wherein the substantially reflection free entry of the microwaves corresponds to capturing at least 3 orders of reflection of the microwaves;

locating the microwave radiometer such that its radiation direction faces the microwave transparent portion; and receiving radiation from the calibration chamber via the microwave transparent portion.

The main idea is to provide a complete termination of the microwaves, namely a beam of microwaves, (hypothetically) emitted by the microwave radiometer to be calibrated within the cooled absorber for two orthogonal polarizations, namely a horizontal polarization and a vertical polarization. Under this condition, the thermal radiation emitted by the cold target will be reciprocally received without reflection by the radiometer. In some embodiments, the beam direction of the microwave radiometer is "reversed", which is possible because physics is reciprocal. Accordingly, the radiation may be emitted by the absorber and propagates towards the microwave radiometer. This concept corresponds to ray "tracing" according to which images are constructed by assuming that rays are emitted by an observer, wherein the rays are followed and investigated in order to identify how the rays impinge on an object.

Generally, the microwave transparent portion is part of the entry interface via which the microwaves of the microwave radiometer to be calibrated may (hypothetically) enter the calibration chamber in order to interact with the absorber placed within the calibration chamber at the defined temperature.

The entry interface is established such that the reflection free entry of the microwaves is ensured since the level of reflected microwaves at the entry interface is significantly reduced, for example minimized, due to the fact that at least three orders of reflection (n=3) of the microwaves are captured by the absorber located in the calibration chamber.

Since the substantially reflection free entry of the microwaves corresponds to capturing at least 3 orders of reflection of the microwaves, it is ensured that all direct and reflected paths up to that third order are terminated on the absorber, namely the absorber material.

This applies in a similar manner to the (thermal) radiation emitted by the absorber.

In some embodiments, the microwave transparent material is thermally insulating, thereby ensuring temperature stability within the calibration chamber.

Generally, the absorber at the defined temperature is cooled down.

The absorber may be established by a plate, for example a plate of reflection-free non-transparent material. The material may have a pyramidal shape, wherein the edges and/or spikes are rounded off. The absorber (material) is cooled down and observed without any absorption and reflection between the absorber (material) and the microwave radiometer. The absorber is located within the calibration chamber, for example in a vertical manner, such that the main plane of the plate-like absorber faces the microwave transparent portion.

An aspect provides that the housing has a structure on at least one internal side of the housing, wherein the internal side delimits the calibration chamber. The structure is used to establish the substantially reflection free entry of the microwaves into the calibration chamber. Put differently, the geometry introduced by the respective structure ensures the reflection free entry of the microwaves.

In some embodiments, the housing has structures on two internal sides of the housing which are opposite with respect to each other, wherein the internal sides delimit the calibration chamber, and wherein the structures are different. The calibration device may have two microwave transparent portions that are located at opposite sides. The respective structures may be differently orientated structures, namely for a horizontal polarization and a vertical polarization. The structures may have defined inclination angles, for example grooves at the Brewster angle for the refractive index transition from 1.0 to 1.2 that occurs at the interface between the air and the liquid nitrogen that may be filled into the calibration chamber, for instance a vessel. Since the freedom from reflections at the Brewster angle is polarization-dependent and since the microwave radiometer typically has two receivers with one vertical and one horizontal polarization, differently orientated structures are provided for the vertical polarization and the horizontal polarization at the opposite sides. In some embodiments, the differently orientated structures at the opposite internal sides relate to horizontally and vertically orientated structures, for instance grooves. During the calibration of the microwave radiometer, the calibration device has to be rotated by 180° such that the microwaves enter the calibration chamber via both microwave transparent portions associated with the differently orientated structures in order to calibrate the microwave radiometer completely, namely with regard to the horizontal polarization and the vertical polarization. The respective calibration steps are done in a subsequent manner, namely with the intermediate rotation of the calibration device.

According to another embodiment, the structure runs diagonally along the internal side. Hence, the structure that runs diagonally along the internal side, for example a surface facing the calibration chamber, is inclined with respect to a bottom by an angle of 45°. Accordingly, the angle of incidence and the decomposition of the polarization(s) into portions parallel and perpendicular are always the same for the vertical polarization and the horizontal polarization. Thus, a single microwave transparent portion is sufficient. Put differently, only one side of the calibration device has to be used for calibrating the microwave radiometer completely.

In other words, it is not necessary to provide two microwave transparent portions and to rotate the calibration device during the calibration of the microwave radiometer.

In general, the 45° orientation of the structure, namely the diagonally running structure, ensures that both polarization planes (vertical and horizontal) are treated in the same way. In contrast thereto, any non-45° orientation would have small disadvantages or advantages for one of the polarizations since the reflection depends on the slope angle and the polarization.

Accordingly, the calibration of the microwave radiometer can be performed independently of the respective polarization and, therefore, the microwave radiometer can be calibrated with regard to both polarizations simultaneously by facing only one side of the calibration device. Due to the simultaneous calibration of two typically differently polarized receivers of the microwave radiometer, the entire calibration procedure takes half as long compared to the calibration procedure in which opposite sides of the calibration device have to be taken into account. In addition, it is no more required to rotate the calibration device.

Generally, the risk of an incorrect calibration is significantly reduced, as only one side of the calibration device is used for calibration purposes rather than two opposite sides. In some embodiments, each side may be prone to condensation issues. Typically, the side not being used at the start has condensation issues. Since only one side of the calibration device is used, namely the one facing the microwave radiometer, the respective risk can be reduced accordingly.

In addition, it is not necessary to provide a structure at opposite sides of the calibration device, resulting in a less complex calibration device. Moreover, the size of the calibration device can be reduced, thereby improving the entire handling of the calibration device. In some embodiments, the amount of liquid nitrogen provided within the calibration chamber can be reduced.

A further aspect provides that the internal side is provided at the wall of the housing at which the microwave transparent portion is provided. The microwave transparent portion is at least provided at an external side of the same wall at which the structure is provided. The microwave transparent portion may extend into the wall at least partially. In some embodiments, the microwave transparent portion passes through the wall completely. In any case, the structure is provided at the entry interface such that the microwaves transmitted into the calibration chamber interact with the respective structure.

As mentioned above, the housing may be made by microwave transparent material that provides a thermal insulation.

In some embodiments, the structure is provided by grooves having steep edges. The grooves may be provided at the internal side of the wall of the housing, for instance by milling. Accordingly, the material of the wall may be thinned in the area of the grooves. Put differently, the structure may be milled within a main surface of the internal side, thereby forming a ridged structure.

Alternatively, converging bars may be placed on the main surface which are spaced from each other, thereby forming the structure. Accordingly, grooves are established between neighbored converging bars.

Irrespective thereof how the structure is formed, the respective edges are steep.

The structure may be ridged, thereby providing a ridged interface between the microwave transparent portion and the calibration chamber, for example any fluid filled into the calibration chamber. The interface may be established between the microwave transparent portion and any medium provided next to the microwave transparent portion within the calibration chamber, for instance liquid nitrogen. The respective interface may correspond to the entry interface. The ridged structure provided in the area of the entry interface ensures the substantially reflection free entry of the microwaves into the calibration chamber.

The ridged structure may have an angle higher than 68° with respect to a main surface of the internal side. Accordingly, the steep edges may be orientated at an angle higher than 68° with respect to a main surface from which the edges originate. The steeply inclined edges of the structure may force the first and second reflections into the absorber where they are terminated appropriately. In some embodiments, the ridged structure bends the reflections to the interior, namely towards the absorber.

The dimension of the inclined edges may be larger than the wavelength of the microwaves, therefore no tapering effect of slow gradual changes takes place, but as a quasi-optical beam trap is provided.

In some embodiments, the steep edges associated with the ridged structure, which may be associated with the single microwave transparent portion, have a steeper inclination angle of slopes than the Brewster angle.

Generally, the idea is to not avoid reflection, but to control the reflection such that third-order reflection is still forwarded towards the absorber and terminated in the absorber.

Another aspect provides that the microwave transparent material has a refractive index of about 1. The refractive index of about 1 means that the refractive index is 1, wherein typically occurring tolerances may occur. Accordingly, the refractive index equals to the refractive index of air. Generally, the microwave transparent material has a refractive index that corresponds to the one of air. Hence, a further refractive index jump can be avoided.

The microwave transparent material may correspond to a highly insulating foam material, for example a foam material with a refractive index of 1.

The respective structure can be processed into the foam material easily, for instance by milling.

A remainder of the housing may comprise a reflective and non-absorbing material. The reflective and non-absorbing material allows to create reflections such that the absorber receives any divergent microwave radiation. Hence, the reflective and non-absorbing material ensures a complete absorption/termination of the microwaves in the absorber by increasing the angle of acceptance since the reflective material catches diverging microwaves and reflects them towards the absorber for termination. For instance, the reflective and non-absorbing material is a metal.

Generally, the reflective and non-absorbing material may be coated on an inner side of the housing. Thus, the entire housing may be made of the foam material, but coated internally with the reflective and non-absorbing material except for the microwave transparent portion(s).

According to another aspect, the calibration chamber is at least partially filled by a fluid at the defined temperature, wherein the absorber is submerged in the fluid. The fluid may be liquid nitrogen at its boiling point such that the absorber submerged has the defined temperature, resulting in defined characteristics of the absorber.

The calibration device can be reduced in size provided that a single microwave transparent portion is provided such that the volume of the fluid required can be reduced accordingly. The reduction of the volume of the fluid required while maintaining the housing results in a greater relative wall thickness achieved, which in turn yields an improved thermal insulation, thereby reducing the risk of condensation.

Furthermore, an interface between the microwave transparent portion and air is provided which is flat. Accordingly, the ridged interface is only provided between the microwave transparent portion and the fluid, namely the liquid nitrogen, in order to compensate for the refractive index jump that occurs at that interface. In contrast thereto, the interface provided between the microwave transparent portion and air does not provide a refractive index jump since the microwave transparent material has a refractive index that is substantially equal to the one of air.

In some embodiments, the interfaces, namely the one between the microwave transparent portion and air and the one between the microwave transparent portion and the fluid, are provided at opposite sides with respect to the microwave transparent portion, namely the external interface to the environment and the internal interface to the interior of the calibration device, namely the calibration chamber.

Moreover, an air flow direction member may be provided that is facing the interface between the microwave transparent portion and air, wherein dried air is directed to the interface. The risk of an incorrect calibration is significantly reduced, as the occurrence of condensation water is prevented effectively. In some embodiments, the beam path originating from the microwave radiometer to the absorber is maintained completely transparent.

The air flow direction member may comprise a blower that is configured to create a strong airflow. The air associated with the airflow may be heated in order to generate the dried air used for avoiding any condensation.

Generally, the side of the calibration device facing the microwave radiometer is subjected to the airflow generated. Hence, the condensation risk is reduced accordingly.

A seal may be provided that is put on the housing, thereby sealing the calibration chamber against the environment. The seal ensures that no temperature exchange occurs between the media within the calibration chamber and the environment which may affect the temperature within the calibration device. The seal concerns an insulation as it ensures temperature stability within the calibration chamber. In some embodiments, condensation of atmospheric oxygen can be avoided, for example the so-called "oxygen entrainment".

Another aspect provides that the calibration device has a spout at one wall of the housing. The spout can be used for pouring out any medium located within the calibration chamber, for example the fluid providing the defined temperature for the absorber, namely the liquid nitrogen. The fluid is poured out after the microwave radiometer has been calibrated appropriately.

The spout may be provided at a wall that is opposite to the wall of the housing at which the microwave transparent portion is provided. This ensures that the pouring does not affect the interface with the microwave transparent portion as the respective medium poured out of the calibration chamber does not flow along the wall at which the microwave transparent portion is provided. In some embodiments, the risk is reduced that the liquid nitrogen comes into contact with the microwave radiometer or any other calibration components. Put differently, the spout for emptying the fluid at the end of the calibration is placed on the wall facing away from the microwave radiometer.

Furthermore, the calibration device may have two handles that are provided at opposite walls that are different to the wall of the housing at which the microwave transparent portion is provided. Since the handles are provided at different walls with respect to the microwave transparent portion (and optionally the spout), an easy handling of the entire calibration device is ensured. In some embodiments, a user may use the handles for tilting the entire calibration device such that any medium located within the calibration chamber, for example the fluid, may be poured out easily. The handles are located on narrow sides of the calibration device, whereas the spout and the microwave transparent portion are located at the long sides of the calibration device. The handles are no longer in danger of being washed over by spilled fluid when pouring out the fluid. Accordingly, the overall handling safety is improved.

Generally, the spout may also be located at a wall at which one of the handles is provided. Since the volume of the liquid nitrogen required is reduced significantly, an operator can easily lift the entire calibration device for pouring out the liquid nitrogen afterwards.

An aspect provides that a complete calibration of the microwave radiometer is provided by using only one side of the calibration device, which has the microwave transparent portion. As mentioned above, the calibration device may have only one single microwave transparent portion that is associated with a structure that runs in a diagonal manner along the inner surface of the respective wall. Hence, the microwave radiometer may be calibrated entirely by using only one side of the calibration device, namely the one with the single microwave transparent portion.

Generally, the aspects mentioned above can be combined with each other, thereby establishing a calibration device with the respective technical advantages indicated.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
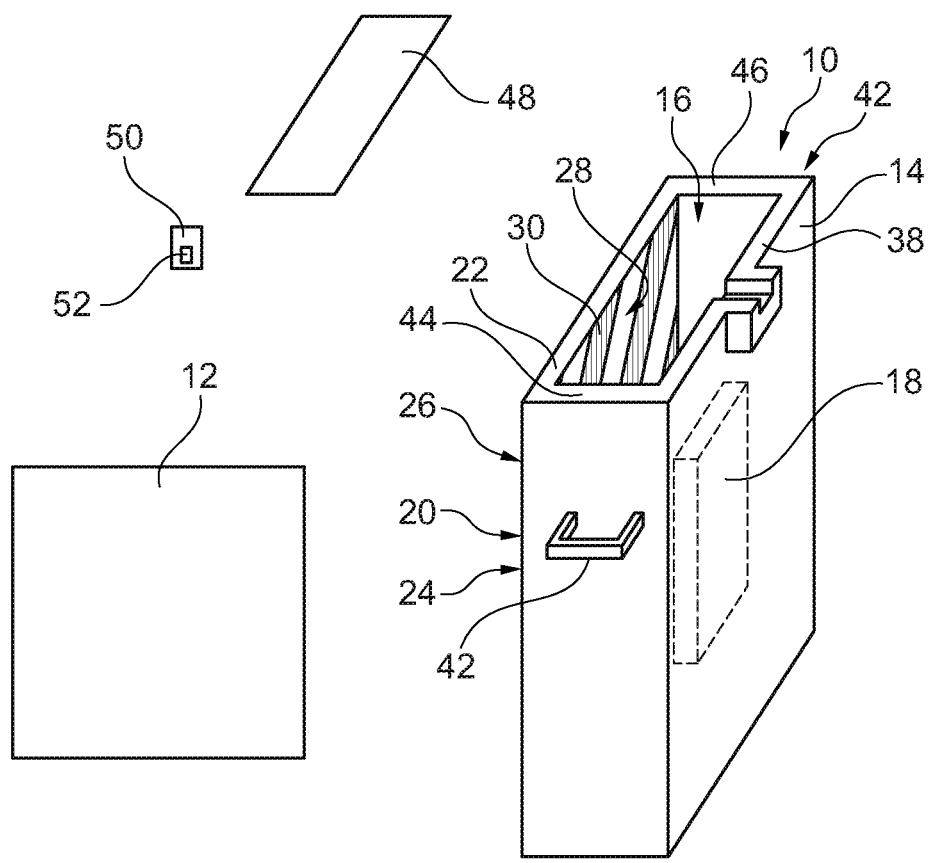
FIG. 1 schematically shows a calibration device according to an embodiment of the present disclosure.

In FIG. 1, a calibration device 10 for precise calibration of a microwave radiometer 12 is shown. The calibration device 10 comprises a housing 14 that encompasses a calibration chamber 16 which is typically filled by a fluid, for instance liquid nitrogen.

An absorber 18 indicated by dashed lines in FIG. 1 is also placed in the calibration chamber 16 such that the absorber 18 is submerged in the fluid, thereby ensuring that the absorber 18 has a defined temperature, for instance a temperature of −196° C. As indicated in FIG. 1, the absorber 18 may be formed like a plate that is placed into the calibration chamber 16 in a vertical manner.

In addition, the housing 14 comprises a microwave transparent portion 20 that is provided at a wall 22 of the housing 14, which faces the microwave radiometer 12 to be calibrated. Generally, the microwave transparent portion 20 defines an entry for the microwaves into the calibration chamber 16 such that they can be absorbed by the absorber 18 located within the calibration chamber 16. Accordingly, an entry interface 24 between the microwave transparent portion 20 and the calibration chamber 16 is provided in the respective wall 22, wherein the absorber 18 is located in the calibration chamber 16.

The microwave transparent portion 20 is part of the entry interface 24 via which microwaves emitted by the microwave radiometer 12 to be calibrated may enter the calibration chamber 16.

The wall 22 has an external side 26 facing the microwave radiometer 12 to be calibrated as well as an internal side 28 facing the calibration chamber 16, thereby delimiting the calibration chamber 16 at least partly. The internal side 28 of the respective wall 22 is shown in more detail in FIG. 2.

In some embodiments, a structure 30 is provided on the internal side 28 of the housing 16. Hence, the structure 30 is provided at the internal side 28 of that wall 22 that comprises microwave transparent portion 20 at its external side 26.

The structure 30 is associated with the entry interface 24, wherein the structure 30 is formed such that a reflection free entry of the microwaves is ensured via the entry interface 24. The microwaves transmitted into the calibration chamber 16 have to interact with the respective structure 30. In some embodiments, the structure 30 introduces a geometry on the internal side 28 of the wall 22, thereby establishing the reflection free entry of the microwaves via the entry interface 24.

This is ensured since at least three orders of reflection (n=3) of the microwaves are captured by the absorber 18 that is located in the calibration chamber 16, for example submerged in the liquid nitrogen that cools the absorber 18 down to the predefined temperature. This is generally illustrated in FIG. 4 to which reference is made below.

The structure 30 runs diagonally along the internal side 28. This becomes obvious from FIG. 2 that shows that the structure 30 is orientated with respect to a bottom by an angle of 45°.

In the shown embodiment, the structure 30 is provided by grooves 32 with steep edges 34. The grooves 32 may be milled into the internal side 28.

Figure 4:
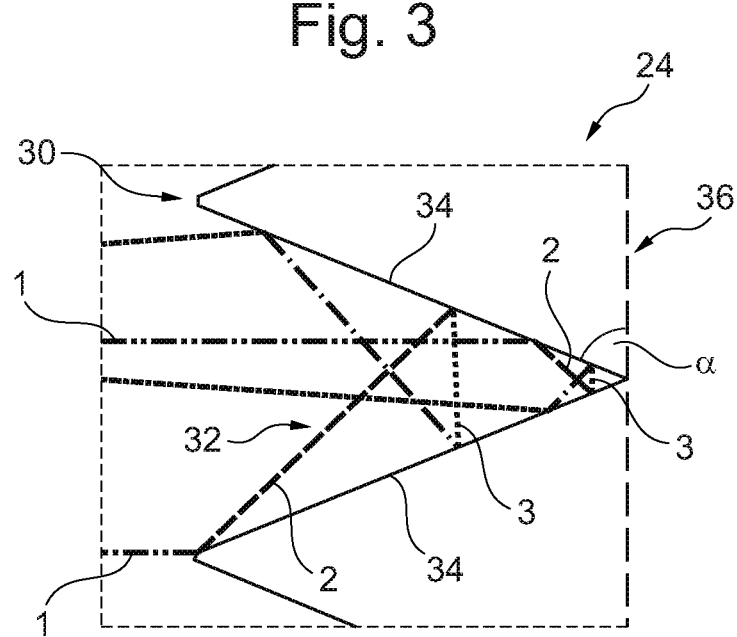
FIG. 4 schematically shows a cross-section illustration of the structure that captures at least 3 orders of reflection of the microwaves.

As shown in FIG. 4. the grooves 32 in combination with the steep edges 34 provide a ridged interface between the microwave transparent portion 20 and the calibration chamber 16, for example the liquid nitrogen filled into the calibration chamber 16. The respective interface corresponds to the entry interface 24, wherein the geometry established by the structure 30 ensures the substantially reflection free entry of the microwaves into the calibration chamber 16.

The ridged structure may have an angle α higher than 68° with respect to a main surface 36 of the internal side 28. In some embodiments, the steeply inclined edges of the structure 30 force the first and second reflections into the absorber 18 where they are terminated, as shown in FIG. 4. The ridged structure 30 bends the reflections to the interior appropriately.

On the opposite side, the microwave transparent portion 20 has a flat interface with the air, namely the environment. The flat interface is facing the microwave radiometer 12 to be calibrated. Accordingly, the external side 26 of the housing 14 is substantially flat as shown in FIG. 1 for the wall 38 being opposite to the wall 22 at which the microwave transparent portion 20 is provided. However, the external sides 26 of all walls are made in a substantially similar manner, for example in a flat manner.

Generally, the housing 14 may be made of a microwave transparent material that has a refractive index of about 1 (like air), for instance a foam material.

The housing 14 may further be partially coated, for example at its internal sides, with a reflective and non-absorbing material, such as a metal coating, except for the microwave transparent portion 20. The reflective and non-absorbing material creates reflections within the calibration chamber 16 such that the absorber 18 receives any divergent microwave radiation.

The reflective and non-absorbing material together with the substantially reflection free entry interface 24 ensure a complete absorption/termination of the microwaves emitted by the microwave radiometer 12 in the absorber 18. In some embodiments, the reflective and non-absorbing material increases the angle of acceptance since the reflective material reflects diverging microwaves towards the absorber 28 for termination.

The part of the housing 14 except for the microwave transparent portion 20 corresponds to a remainder of the housing 14. Alternatively, the remainder of the housing is made of a metal, wherein the microwave transparent portion 20 is made of a material that is transparent for microwaves in order to establish the entry interface 24.

FIG. 1 further shows that the calibration device 10 has a spout 40 at the wall 38 of the housing 14 that is opposite to the wall 22 of the housing 14 at which the microwave transparent portion 20 is provided. The spout 40 is used for pouring out the liquid nitrogen after the respective calibration has been finished.

Moreover, the calibration device 10 has two handles 42 that are provided at opposite walls 44, 46 that are different to the wall 22 of the housing 14 at which the microwave transparent portion 20 is provided.

The handles 42 are provided at the narrow sides of the calibration device 10, whereas the spout 40 and the microwave transparent portion 20 are located at the long sides of the calibration device 10. This simplifies the handling of the calibration device 10.

In addition, the calibration device 10 comprises a seal 48 established by a lid that can be put on the calibration chamber 16 in order to cover and seal the calibration chamber 16 during the calibration. This ensures that the calibration chamber 16 is sealed against the environment. Hence, oxygen entrainment can be prevented effectively.

The calibration device 10 also has an air flow direction member 50 that, in the mounted state, faces the interface between the microwave transparent portion 20 and air. Via the air flow direction member 50, dried air is directed to the interface.

The air flow direction member 50 comprises a blower 52 that is configured to create a strong airflow. The air associated with the airflow may be heated in order to generate the dried air.

The air flow direction member 50 is shown in FIG. 1 in a disassembled manner. However, the air flow direction member 50 can be connected with the external side 26 of the respective wall 22. Alternatively or additionally, the air flow direction member 50 may be connected with the seal 48, thereby facing downwardly towards the interface.

Figure 3:
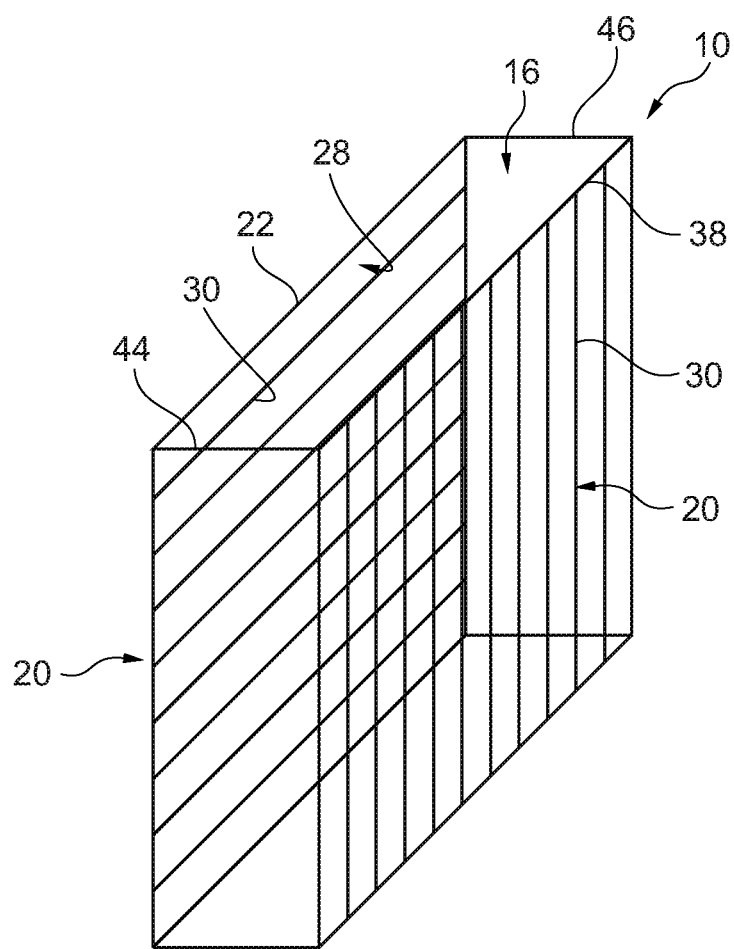
FIG. 3 schematically shows another calibration device according to an embodiment of the present disclosure in a partially transparent manner.

In FIG. 3, another embodiment of the calibration device 10 is shown in a partially transparent manner.

The calibration device 10 according to this embodiment comprises two microwave transparent portions 20 that are located at the opposite walls 22, 38.

The microwave transparent portions 20 are associated with structures 30 provided at the respective inner surfaces 28 of these walls 22, 38. As shown in FIG. 3, the respective structures 30 are differently orientated, namely in a vertical manner and a horizontal manner. Accordingly, the structures 30 are perpendicular with respect to each other.

Accordingly, the different structures 30 are orientated in a defined manner, namely perpendicular with respect to each other. The structures 30 may also be established by grooves 32 that however are orientated at the Brewster angle for the refractive index transition from 1.0 to 1.2 that occurs at the interface between the air and the liquid nitrogen filled into the calibration chamber 16.

Figure 2:
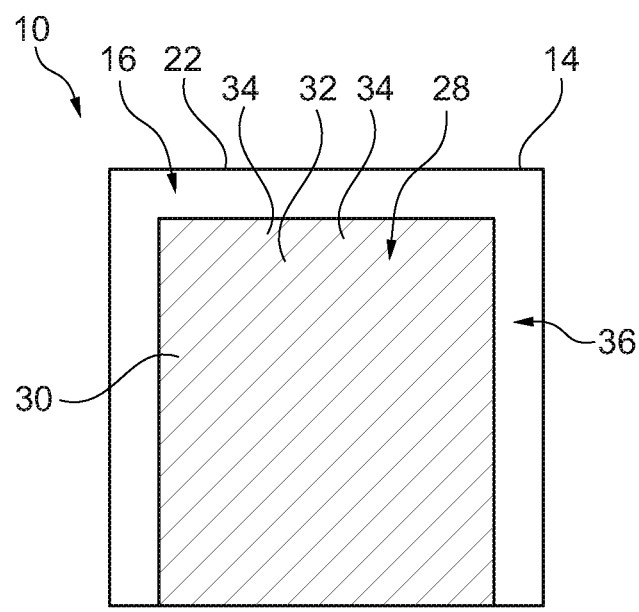
FIG. 2 schematically shows a front view on an inner side of the housing of the calibration device shown in FIG. 1.

Generally, the calibration device 10 shown in FIGS. 1 to 3 is used to calibrate the microwave radiometer 12 in a precise manner.

For this purpose, the microwave transparent material is an insulating one in order to ensure thermal stability with the calibration chamber 16. In some embodiments, it is ensured by the insulating microwave transparent material that the temperature of the absorber 18 is stable and defined during the calibration of the microwave radiometer 12.

Therefore, a complete termination of the microwaves (hypothetically) emitted by the microwave radiometer 12 to be calibrated within the absorber 18 placed in the calibration chamber 16 for two orthogonal polarizations is ensured, namely a horizontal polarization and a vertical polarization.

The calibration device 10 shown in FIGS. 1 and 2 comprises the structure 30 that runs diagonally along the internal side 28 of the wall 22. Accordingly, the angle of incidence is always the same for the vertical polarization and the horizontal polarization. Further, the decomposition of the polarization(s) into portions parallel and perpendicular are also always the same.

Thus, the single microwave transparent portion 20 is sufficient for the complete calibration of the microwave radiometer 12. Put differently, only one side of the calibration device 10 has to be faced by the microwave radiometer 12 for its complete calibration.

The single microwave transparent portion 20 comprises the structure 30 shown in FIG. 4 that has the grooves 32 as well as the steep edges 34 at the internal side 28 of the wall 22.

FIG. 4 illustrates a cross-sectional view of the entry interface 24 or rather the ridged interface, thereby illustrating the ridges provided by the grooves 32 as well as the steep edges 34. In some embodiments, the grooves 32 as well as the steep edges 34 run diagonally along the internal side (45° orientation) as illustrated in FIGS. 1 and 2.

As already mentioned, the 45° orientation of the structure 30, namely the diagonally running structure, ensures that both polarization planes (vertical and horizontal) are treated in the same way by the entry or rather ridged interface 24. In contrast thereto, any non-45° orientation would have small disadvantages or advantages for one of the polarizations since the reflection depends on the slope angle and the polarization.

The respective interface 24 ensures the reflection free entry of the microwaves since the structure 30, for example the grooves 32 and the steep edges 34, captures at least three orders of reflection (n=3) of the microwaves since all direct and reflected paths up to that third order are terminated on the absorber 18 located within the calibration chamber 16.

In general, the structure 30 with the steep edges 34 having the angle α higher than 68° with respect to the main surface 36 ensures that third order rays or rather beam paths, namely the ones after two reflections, are vertical with respect to the grooves 32 or rather parallel to the main surface 36, which is called "in-bound". This is indicated by the respective numbers in FIG. 4.

Put differently, the angle α is higher than the respective Brewster angle, thereby ensuring that also at least the third order reflection is still inbound.

In some embodiments, a slope of 68° ensures in-bound third order reflection. Preferably, the angle is between 70° to 72°, as the radiometer 12 has a finite beam-divergence of 1° to 2°. Moreover, uncertainties associated with the mounting and/or alignment of the absorber 18 occur that may have an effect of 1° to 3°.

In contrast to the embodiment shown in FIGS. 1 and 2, both opposite sides of the calibration device 10 shown in FIG. 3 needs to be taken into account when calibrating the microwave radiometer 12 completely. In some embodiments, the first side comprises the first microwave transparent portion 20 associated with the first structure 30, for instance the one for the horizontal polarization, whereas the second side opposite to the first side comprises the second microwave transparent portion 20 associated with the second structure 30, for instance the one for the vertical polarization.

Accordingly, the calibration device 10 shown in FIG. 3 has to be rotated by 180° between two subsequent measurement steps that are associated with the horizontal polarization of the microwave radiometer 12 and the vertical polarization of the microwave radiometer 12.

In other words, the embodiment shown in FIGS. 1 and 2 provides a simpler and faster calibration since it is not necessary to manufacture two microwave transparent portions 20 within the calibration chamber 16. In addition, the calibration procedure is simplified since the calibration device 10 does not have to be rotated during the calibration of the microwave radiometer 12. Accordingly, the calibration of the microwave radiometer 12 can be performed independently of the respective polarization and, therefore, the microwave radiometer 12 can be calibrated with regard to both polarizations simultaneously by facing only one side of the calibration device 10 shown in FIGS. 1 and 2.

In both embodiments, the microwaves hypothetically emitted by the microwave radiometer 12 enters the calibration chamber 16 via the entry interface 24 provided between the microwave transparent portion 20 and the calibration chamber 16, namely the liquid nitrogen located within the calibration chamber 16. The entry interface 24 provides the substantially reflection free entry of the microwaves that corresponds to capturing at least 3 orders of reflection of the microwaves.

Accordingly, standing waves can be avoided, which may lead to an incorrect calibration of the microwave radiometer 12.

The calibration device 10 can be used for precise calibration of the microwave radiometer 12.

However, the beam direction of the microwave radiometer 12 is "reversed" for calibration purposes, which is possible because physics is reciprocal. Accordingly, radiation may be emitted by the absorber 18 located within the calibration chamber 16, wherein the radiation emitted by the absorber 18 propagates towards the microwave radiometer 12 to be calibrated, which receives the radiation accordingly. This concept corresponds to ray "tracing".

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A calibration device for precise calibration of a microwave radiometer, comprising:
    a housing that partially encompasses a calibration chamber, wherein the housing comprises a microwave transparent portion that is provided at a wall of the housing, wherein the microwave transparent portion defines an entry for microwaves into the calibration chamber, wherein the microwave transparent portion is made by a microwave transparent material that is insulating;
    an absorber at a defined temperature is provided within the calibration chamber,
    wherein an entry interface between the microwave transparent portion and the calibration chamber is provided, which ensures a substantially reflection free entry of the microwaves into the calibration chamber, and wherein the substantially reflection free entry of the microwaves corresponds to capturing at least 3 orders of reflection of the microwaves.

2. The calibration device according to claim 1, wherein the housing has a structure on at least one internal side of the housing, wherein the internal side delimits the calibration chamber.

3. The calibration device according to claim 2, wherein the housing has structures on two internal sides of the housing which are opposite with respect to each other, wherein the internal sides delimit the calibration chamber, and wherein the structures are different.

4. The calibration device according to claim 2, wherein the structure runs diagonally along the internal side.

5. The calibration device according to claim 2, wherein the internal side is provided at the wall of the housing at which the microwave transparent portion is provided.

6. The calibration device according to claim 2, wherein the structure is provided by grooves having steep edges.

7. The calibration device according to claim 2, wherein the structure is ridged, thereby providing a ridged interface between the microwave transparent portion and the calibration chamber.

8. The calibration device according to claim 7, wherein the ridged structure has an angle higher than 68° with respect to a main surface of the internal side.

9. The calibration device according to claim 1, wherein the microwave transparent material has a refractive index of about 1.

10. The calibration device according to claim 1, wherein a remainder of the housing comprises a reflective and non-absorbing material.

11. The calibration device according to claim 1, wherein the calibration chamber is at least partially filled by a fluid at the defined temperature, wherein the absorber is submerged in the fluid.

12. The calibration device according to claim 1, wherein an interface between the microwave transparent portion and air is provided which is flat.

13. The calibration device according to claim 12, wherein an air flow direction member is provided that is facing the interface between the microwave transparent portion and air, wherein dried air is directed to the interface.

14. The calibration device according to claim 1, wherein a seal is provided that is put on the housing, thereby sealing the calibration chamber against the environment.

15. The calibration device according to claim 1, wherein the calibration device has a spout at one wall of the housing.

16. The calibration device according to claim 1, wherein the calibration device has two handles that are provided at opposite walls that are different to the wall of the housing at which the microwave transparent portion is provided.

17. A method of calibrating a microwave radiometer, wherein the method comprises:
providing a microwave radiometer;
providing a calibration device that has a housing that partially encompasses a calibration chamber, wherein the housing comprises a microwave transparent portion that defines an entry for microwaves into the calibration chamber, wherein the microwave transparent portion is made by a microwave transparent material that is insulating, wherein an absorber at a defined temperature is provided within the calibration chamber, wherein an entry interface between the microwave transparent portion and the calibration chamber is provided, which ensures a substantially reflection free entry of the microwaves into the calibration chamber, and wherein the substantially reflection free entry of the microwaves corresponds to capturing at least 3 orders of reflection of the microwaves;
locating the microwave radiometer such that its radiation direction faces the microwave transparent portion; and
emitting microwaves into the calibration chamber via the microwave transparent portion.

18. The method according to claim 17, wherein a complete calibration of the microwave radiometer is provided by using only one side of the calibration device, which has the microwave transparent portion.

* * * * *